United States Patent [19]

Suzuki et al.

[11] Patent Number: 4,916,981
[45] Date of Patent: Apr. 17, 1990

[54] HOLLOW ROLLER

[75] Inventors: Keiji Suzuki; Kouichi Ueda, both of Osaka, Japan

[73] Assignee: Koyo Seiko Co., Ltd., Osaka, Japan

[21] Appl. No.: 272,795

[22] Filed: Nov. 18, 1988

[30] Foreign Application Priority Data

Nov. 20, 1987 [JP] Japan ............... 62-178126[U]

[51] Int. Cl.$^4$ ................................. F16H 13/06
[52] U.S. Cl. ................... 475/183; 384/625; 475/901
[58] Field of Search .............. 74/798; 384/625

[56] References Cited

U.S. PATENT DOCUMENTS

| 1,757,476 | 5/1930 | Rennerfelt | 74/798 |
| 2,145,864 | 2/1939 | Denneen et al. | 384/625 X |
| 4,240,682 | 12/1980 | Benson | 384/625 X |
| 4,659,241 | 4/1987 | Bamberger et al. | 384/625 |
| 4,696,581 | 9/1987 | Tsushima et al. | 384/625 X |

Primary Examiner—Dirk Wright

[57] ABSTRACT

A hollow roller which comprises a hardened outer surface, and a non-hardened inner surface which has not been subjected to carburization process, whereby soft portions remain at the inner surface of the hollow roller in order to prevent the inner surface from being cracked in response to external shock. Preferably, the hollow roller is applied to a planet roller or a cylindrical roller.

11 Claims, 2 Drawing Sheets

HOLLOW ROLLER

BACKGROUND OF THE INVENTION

The present invention relates to a hollow roller suitable for a power transmission of a planet roller type or a roller bearing.

Conventionally, when a hollow roller adapted for a power transmission of a planet type roller or a roller bearing is made of bearing steel, the surface of the steel is hardened by a carburizing process to enhance wear resistance of an outer surface when coming in contact with an opposing surface.

Conventionally, it has been considered that a soft portion should be retained at the inside of the thickness hollow roller to relax any shock.

If the hollow roller is thick enough, such a soft portion can remain. In the case of a hollow roller suitable for a compact roller bearing or a power transmission of a planet roller type which is rather thin, it is difficult to retain the soft portion at the inside of the thickness because it is difficult to precisely control the depth of carburization, in particular, due to the development of carburizing from both the outer surface and the inner side of the hollow roller. If the hollow roller is hardened from the inside and the soft portion is not retained there, tentative deformation due to shock is followed by concentration of tensile stress at the inner surface of the hollow roller, so that the portion may readily crack.

Therefore, conventionally, a rather thick hollow roller is carburized and, then, a hardened portion at the inside surface is ground to expose a soft portion at the inner surface of the hollow roller which is thin enough.

However, the inner side must be ground after the carburizing process, whereby the manufacturing steps become much to troublesome and costly.

SUMMARY OF THE INVENTION

Accordingly, it is an object of the present invention to provide a hollow roller with an improved structure for preventing the inner surface of the hollow roller from cracking where stress is concentrated, the hollow roller being readily fabricated at a low cost.

It is another object of the present invention to provide a hollow roller with an improved structure for eliminating the grinding of the inner surface of the hollow roller.

Briefly described, in accordance with the preferred embodiment of the present invention, the outer surface of a hollow roller except for its inner surface, is hardened, so that soft portions remain at the inner surface. Preferably, the hardening process is a carburization process for selectively carburizing the outer surface, except for the inner surface.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
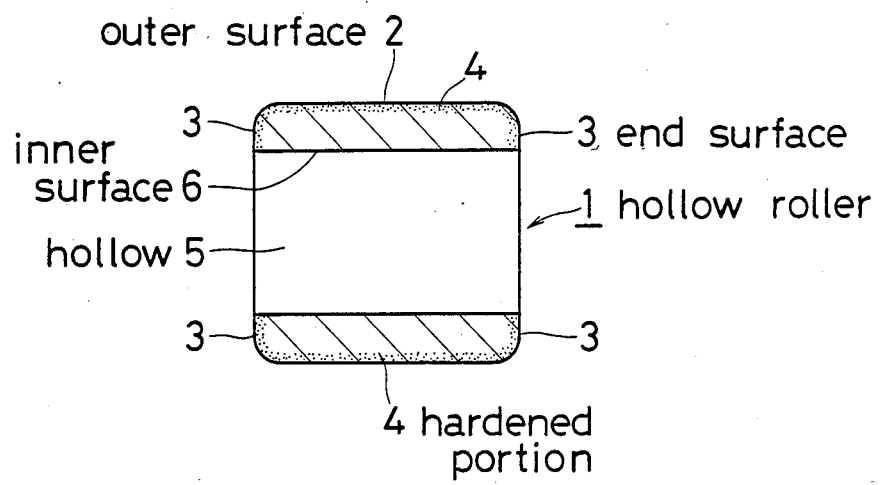
FIG. 1 is a cross sectional view of a hollow roller according to a preferred embodiment of the present invention.

FIG.1 shows a hollow roller according to a preferred embodiment of the present invention. A hollow roller 1 is made of, for example, bearing steel, cylindrical in shape. An outer surface 2 and an end surface 3 of the hollow roller 1 are subjected to carburization to thereby form a hardened portion 4 to a predetermined depth. An inner surface 6 of the hollow roller 1 is not subjected to carburization, so that the inner surface 6 remains soft. In FIG. 1, the hardened portion 4 is denoted by dots. The outer surface 2 opposing an external element during rotation is subjected to carburization, so as to prevent the abrasion of the outer surface 2.

To carry out partial carburization, the inner surface 6 of the hollow roller 1 is coated with a carburization preventive agent, such as copper, and then carburization is carried out. After carburization, the carburization preventive agent may be removed or may not.

Figure 2:
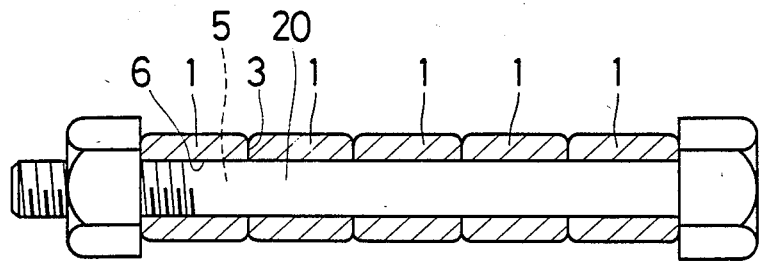
FIGS. 2 and 3 are cross sectional views of the hollow roller to explain partial carburization used in the present invention.

Alternatively, as shown in FIG. 2, a bolt or shaft 20 is inserted into the hollow 5 to fastener several hollow rollers 1, in which case the inner surfaces 6 of the hollow rollers 1 and the end surfaces 3 of them are prevented from carburization. In this method, a plurality of hollow rollers 1 can be processed at once.

Figure 3:
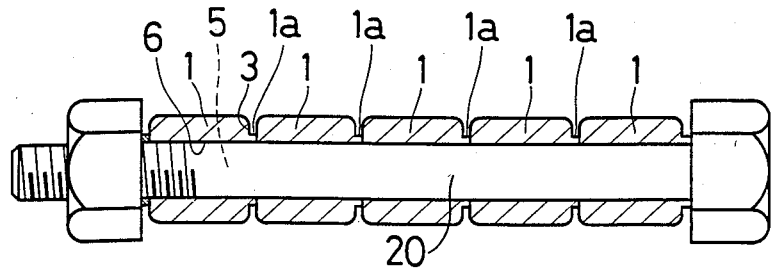

Still alternatively, as shown in FIG. 3, one or both sides of the hollow roller 1 are provided with a very little step 1a, so that the hollow roller 1 with the step 1a is subjected to carburization by the method described in connection with FIG. 2. In this case, only the inner surface 6 of the hollow roller 1 only is prevented from carburization. After carburization, the step 1a is removed. With this method, the end surfaces 3 of the hollow rollers 1 are subjected to carburization. As will be described in connection with FIG. 4 below. the end surfaces 3 of the hollow rollers 1 may be in contact with the opposing faces.

In any respect partial carburization can be enabled by shielding portions not to be carburized from the carburization atmosphere by any shield member. The depth of the hardened portion 4 can be controlled by controlling the depth of carburization. Preferably, a temperature of carburization is about 800° to 950° C. while the depth of carburization is about 0.5 to 1 mm. Because the un-carburized portions in the inner surface 6 of the hollow roller 1 and the end surfaces 3 are made selectively, reaming can be applied to the inner side in order to enhance the preciseness of the inner surface 6. Reaming is easier than the conventional grinding of the inner surface 6.

As stated above, when shock is applied to the hollow roller 1 in operation, the hollow roller 1 might be deformed tentatively and tensile stress is concentrated at the inner surface 6 of the hollow roller 1.

According to the present invention, if the soft portions remain at the inner surface 6 of the hollow roller 1, the inner surface 6 can be prevented from cracking at an early stage. In particular, if the hollow roller 1 is very thin, the soft portions can be selectively retained with the present invention. The inner surface 6 of the hollow roller 1 can thus be prevented from cracking at an early stage.

Further, as compared with the conventional case in which a thick hollow roller is provided which is subjected to carburizing and, then the inner surface is ground to obtain a thin hollow roller, the manufacturing steps become less costly.

Figure 4:
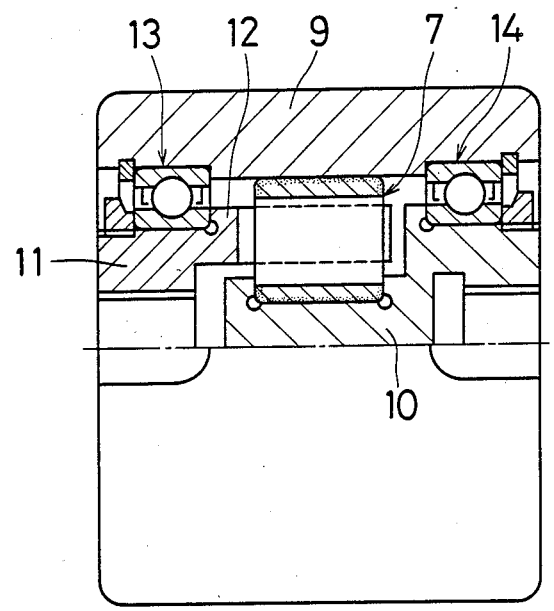
FIG. 4 is a cross sectional view of the upper half of a power transmission of a planet roller type to which the hollow roller of FIG. 1 is adapted.
Figure 5:
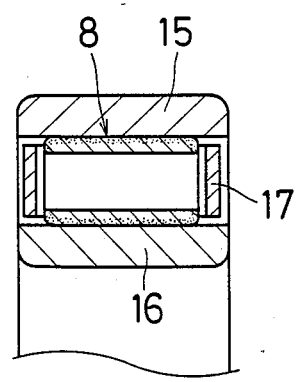
FIG. 5 is a cross sectional view of the upper half of a cylindrical roller bearing to which the hollow roller of FIG.1 is adapted.

FIG. 4 shows a planet roller 7 of a power transmission of a planet roller type to which the hollow roller 1 is applied. FIG. 5 shows a cylindrical roller 8 of a cylindrical roller bearing to which the hollow roller 1 is applied.

In FIG. 4, there are provided a fixed race 9, a first rotation shaft 10 functioning as a sun race, a second rotation shaft 11 coaxial with the first rotation shaft 10, a carrier 12 integrally formed at the end of the second rotation shaft 11, the carrier being rotatable in unison with the planet roller 7, a roller bearing 13 for supporting the first rotation shaft 10 to the fixed race 9, and another roller bearing 14 for supporting the second rotation shaft 11 to the fixed race 9.

In FIG. 5, there are provided an outer race 15, an inner race and a cage 17.

In these preferred embodiments of the present invention, the hardened portions 4 are formed at the outer surface 2 and the end surface 3. It may be possible to form the hardened portions only at the outer surface 2 or at least a predetermined part of the outer surface 2. The hollow roller 1 is exemplified to be cylindrical, but should not be limited for example. It may be tapered.

As mentioned above, in accordance with the present invention, upon receipt of shock to the hollow roller, the stress is concentrated on the inner surface of the hollow roller. However, since the carburization process is applied to the portions except the inner surface of the hollow roller, the inner surface of the hollow roller and the inside of the hollow roller selectively have soft portions to prevent the inner surface of the hollow roller from starting to crack.

Further, without the grinding of the hardened inside surface in the conventional case, the manufacturing steps are simplified with a low cost according to the present invention.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A thin-sectional hollow roller, disposed rotatably between a first rotatable member and a second stationary member, comprising:
    a hardened outer surface;
    a pair of hardened end surfaces adjacent to both sides of said hardened outer surface; and
    a non-hardened soft inner surface;
    whereby soft portions remain at said inner surface of the hollow roller in order to prevent said inner surface from being cracked in response to external shock.

2. A thin-sectional hollow roller of claim 1, wherein said hollow roller is cylindrical.

3. A traction roller transmitting apparatus comprising:
    a stationary wheel having a bore;
    a first shaft as a sun roller, one end of which being disposed within said bore;
    a plurality of planetary hollow rollers consisting of said thin-sectional hollow roller of claim 1, disposed between said stationary wheel and said first shaft, in pressing contact therewith;
    a second shaft, one end of which being disposed at an opposite side to said first shaft within said bore and having a radial flange; and
    a plurality of stud pins secured to said flange and journalled to said plurality of planetary hollow rollers.

4. A method of preparing a hollow roller having a hardened outer surface and a non-hardened inner surface comprising:
    providing a hollow roller of a soft metallic material having an outer surface including end surfaces and an inner surface; and
    selectively subjecting said hollow roller to a hardening means such that said outer surface of said hollow roller inclusive of said end surfaces are hardened while said inner surface remains soft.

5. The method of claim 4, wherein said hardening process is a carburization process.

6. The method of claim 5, wherein said inner surface of said hollow roller is pre-coated with a carburization preventive agent prior to said carburization process.

7. A method of preparing a plurality of hollow rollers with a hardened outer surface and a non-hardened inner surface which comprises:
    providing a plurality of hollow rollers of a soft metallic material having an outer surface including end surfaces and an inner surface;
    inserting a shaft into said hollow of said hollow rollers; and
    selectively subjecting said plurality of hollow rollers to a hardening process such that said outer surfaces of said rollers are hardened while said end surfaces and inner surfaces of said rollers remain soft.

8. The method of claim 7, wherein at least one side of each of said plurality of rollers is provided with a removable step portion such that during said hardening process both said outer surfaces and said end surfaces of said rollers are hardened.

9. The method of claim 7, wherein said hardening process is a carburization process.

10. The method of claim 1, wherein said soft metallic material is bearing steel.

11. The method of claim 5 wherein temperature of carburization is about 800° to 950° C. while depth a carburization is about 0.5 to 1.0 mm.

* * * * *